Oct. 26, 1965   B. E. MURPHY   3,213,644
UNIVERSAL JOINT
Filed Jan. 4, 1963
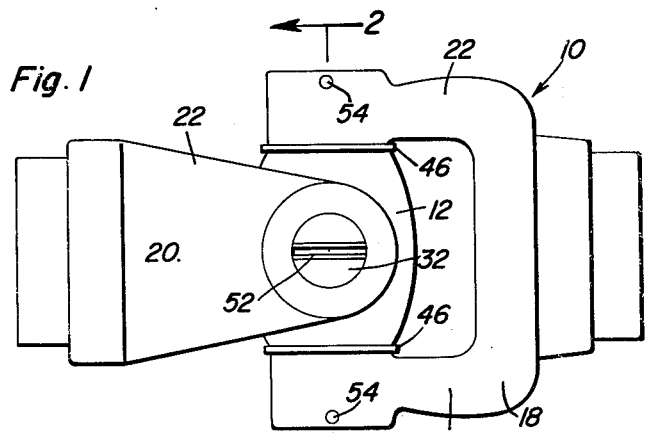
Fig. 1
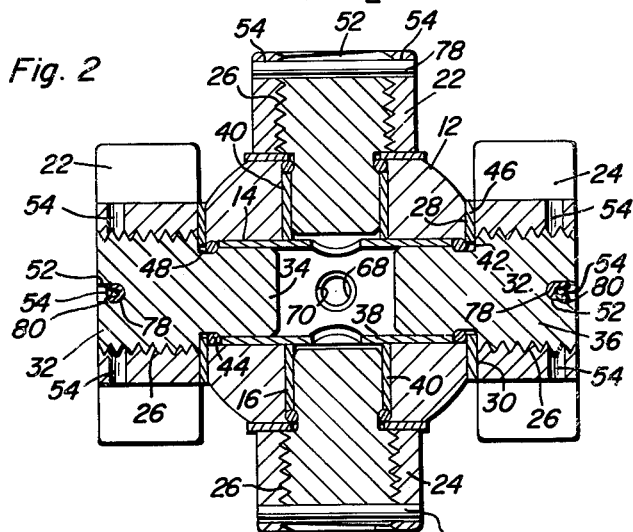
Fig. 2
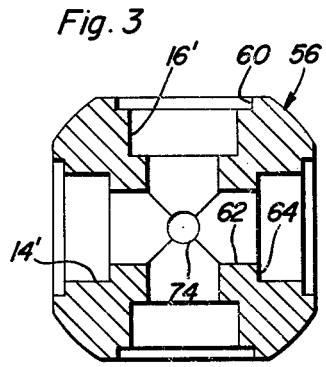
Fig. 3
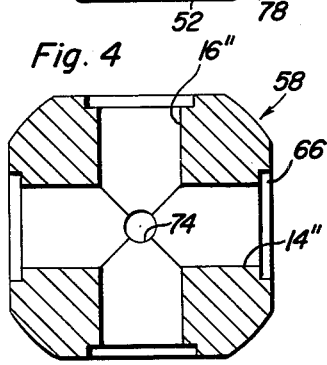
Fig. 4
Fig. 5
Bynum E. Murphy
INVENTOR.

United States Patent Office 3,213,644
Patented Oct. 26, 1965

---

3,213,644
UNIVERSAL JOINT
Bynum E. Murphy, Minden, La., assignor to Anderson-Dunham, Inc., doing business as Dunham Manufacturing Company, Minden, La., a corporation of Louisiana
Filed Jan. 4, 1963, Ser. No. 249,372
7 Claims. (Cl. 64—17)

This invention relates to a novel and useful universal joint for drivingly coupling two rotating shafts. While there are many universal joints which are commercially available and are capable of performing the desired function in an efficient manner, most of these universal joints are very difficult to overhaul and are constructed in a manner whereby the replacement of worn parts during the overhauling of the universal joint involves the replacement of expensive parts and in some cases necessitates the use of special tools with an expenditure of considerable effort on the part of a skilled workman. The high cost of replacement parts, the appreciable time which must be spent to perform an overhaul operation, and the necessity for the use of special tools all add up to considerable expense each time some types of universal joints are overhauled.

It is therefore the main object of this invention to provide a novel universal joint which will be dependable in operation and yet which may be readily serviced and overhauled when necessary.

A further object of this invention, in accordance with the immediately preceding object, is to provide a universal joint which may be overhauled with a minimum of tools and with very little effort.

Another object of this invention is to provide a universal joint constructed in a manner whereby the bearing surfaces thereof are constructed in a manner enabling them to be inexpensively replaced.

A still further object of this invention is to provide a universal joint in accordance with the preceding objects constructed in a manner whereby the bearing surfaces thereof will be tightly sealed from the external surfaces of the universal joint.

A final object of this invention to be specifically enumerated herein is to provide a universal joint in accordance with the preceding objects which will conform to conventional forms of manufacture, be of simple construction and inexpensive to produce so as to provide a device that will be economically feasible, long lasting and a suitable replacement for existing inexpensive universal joints.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a side elevational view of the universal joint;

FIGURE 2 is a sectional view on an enlarged scale taken substantially upon the plane indicated by the section line 2—2 of FIGURE 1;

FIGURES 3 and 4 are transverse sectional views of modified forms of cross blocks constructed in accordance with the present invention; and FIGURE 5 is a diametric sectional view of one of the dished thrust washers utilized in the construction of the universal joint.

Referring now more specifically to the drawings the numeral 10 generally designates the universal joint of the instant invention which includes a cross block 12 having a pair of mutually perpendicular bores 14 and 16 formed therethrough. The bores 14 and 16 are disposed in the same plane and intersect at their mid-portions.

A pair of yokes 18 and 20 are provided and each yoke 18 and 20 includes a pair of generally parallel arms 22 and 24 provided with aligned threaded bores 26. The arms 22 and 24 of the yokes 18 and 20 embrace corresponding pairs of opposite sides of the blocks 12. The opposite ends of the bores 14 and 16 open outwardly through pairs of parallel opposite side faces 28 of the block 12 which confront the corresponding inner faces 30 of the corresponding arms 22 and 24 of the yokes 18 and 20. The bores 26 formed in each yoke are aligned with the opposite ends of the corresponding one of the bores 14 and 16 and four pivot pins 32 are provided and include small diameter journal inner end portions 34 and large diameter threaded end portions 36. The four pivot pins have their large diameter threaded end portions 36 threadedly engaged in the corresponding bores 26 with the journal end portions 34 projecting into the adjacent end of the corresponding one of the bores 14 and 16.

Cylindrical bearing sleeves 38 and 40 are disposed in the bores 14 and 16 and the outer ends of the sleeve bearings 38 and 40 terminate a spaced distance inwardly of the corresponding one of the bores 14 and 16.

An annular abutment shoulder 42 is defined on each pivot pin 32 between the journal and threaded end portions thereof and an annular sealing washer 44 of resilient material is disposed about each journal end portion 34 between the corresponding one of the abutment shoulders 42 and the adjacent end of the corresponding sleeve bearing. In addition, a dished resilient thrust washer 46 is disposed about each journal end portion 34 and between the corresponding pair of faces 28 and 30. Each of the thrust washers 46 is compressively engaged between the faces 28 and 30 and it may be seen from FIGURE 2 of the drawings that a diametrically reduced portion 48 is formed on each pivot pin 32 between the journal and threaded end portions thereof defining a seat for the corresponding annular sealing washer 44.

The outer end face of each pivot pin 32 has a generally diametric kerf 52 formed therein whose opposite ends are simultaneously registrable with the adjacent ends of a pair of generally radially extending and axially aligned bores 54 formed in each of the arms 22 and 24. The arms 22 and 24 are each provided with two pairs of the radial bores 54 in order that the corresponding kerf 52 may be registered with a different pair of the radial bores 54 each time the pivot pin 32 is rotated 90 degrees.

With attention now directed to FIGURES 3 and 4 of the drawings there will be seen modified forms of cross blocks generally referred to by the reference numerals 56 and 58 respectively. The cross block 56 includes mutually perpendicular bores 14' and 16' corresponding to bores 14 and 16 but also includes a counterbore 60 formed in the outer end of each of the bores 14 and 16'. In addition the mid-portions of each of the bores 14 and 16 are defined by a diametrically reduced portion 62 defining a pair of annular abutment shoulders 64 in each of the bores 14 and 16' which open outwardly of the opposite end thereof. The cross block 56 is designed to utilize needle bearing assemblies and it may be seen that the needle bearing assemblies may be seated against the corresponding one of the abutment shoulders 64.

The cross block 58 includes a pair of bores 14" and 16" corresponding to bores 14 and 16 and the opposite ends of the bores 14" and 16" are each provided with a counterbore 66. The cross block 58 is designed to use "Mechanite" bearings and the counterbores 66 are provided, as in the case with the counterbore 60 as a seat for annular sealing washers such as sealing washers 44.

The block 12 includes a passage 68 whose inner end communicates with the intersection of the bores 14 and 16 by which lubricating material may be admitted into the interior of the block 12. The sleeve bearing 38 includes openings 70 enabling the lubricating material to enter the interior of the sleeve bearings 40 are open thereby also enabling the lubricating material to enter the sleeve bearings 40. In addition, each of the cross blocks 58 and 56 includes a passage 74 whose inner end opens into the inner section of the corresponding bores. The outer ends of the passages 74 open outwardly of the blocks 58 and may be provided with a suitable grease fitting.

After the universal joint 10 has been assembled, a longitudinally grooved locking pin 78, is passed through each kerf 52 and the bores 54 registered therewith. The longitudinal grooves 80 formed in the locking pins 78 enable the pins to be yieldingly urged toward slightly expanded positions in tight frictional engagement with the surfaces defining the kerfs 52 and the bores 54. In addition, the portions of each pin 78 defining the portion of the groove 80 formed therein received in the corresponding kerf 52 may be forced apart after the universal joint 10 has been completely assembled. In this manner, the portions of the pins 78 which have been forced apart will prevent unintentional axial shifting of the pins 78 outwardly of the bores 54 since the forced apart portions of each of the pins 78 will be too large in cross sectional shape to enter the inner ends of the corresponding bores 54, see FIGURES 1 and 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A universal joint comprising a cross block having a pair of mutually perpendicular bores formed therethrough opening outwardly of said block at opposite ends through pairs of parallel opposite side faces disposed at right angles relative to each other, a pair of yokes each including a pair of generally parallel arms having aligned threaded bores formed therethrough larger in diameter than said mutually perpendicular bores and whose adjacent ends open through generally parallel inner faces, said yokes each being disposed with its arms embracing said block and generally paralleling the corresponding pair of said sides and its threaded bores aligned with the opposite ends of the corresponding one of said mutually perpendicular bores, and four pivot pins each including a small diameter journal end portion and a larger diameter threaded end portion threadedly engaged in said threaded bores with said journal end portions extending into and rotatably received in the adjacent end of the corresponding bore, said pivot pins each including a generally radially outwardly projecting shoulder between said end portions, wherein said mutually perpendicular bores being larger in diameter than said journal end portions, cylindrical bearing means disposed in said mutually perpendicular bores rotatably journaling said journal end portions, a dished thrust washer snugly disposed on each of said journal end portions compressively engaged between the corresponding side face of said block and the confronting face of the corresponding shoulder and inner face, the outer ends of said cylindrical bearing means terminating a space distance inwardly of the corresponding opposite ends of said mutually perpendicular bores, resilient annular sealing washers disposed about each of said journal end portions inwardly of the corresponding one of said thrust washers, the opposite ends of said mutually perpendicular bores including counterbores in which said sealing washers are compressively seated, said mutually perpendicular bores spaced inwardly from said counterbores each including a reduced diameter portion defined by a pair of annular shoulders at its opposite ends defining inner abutments for said cylindrical bearing means.

2. The combination of claim 1 wherein said cross block includes lubricating passage means, other than said mutually perpendicular bores communicating the area defined by the intersection of said mutually perpendicular bores with the exterior of said block.

3. The combination of claim 1 wherein the outer face of each of said pins has a generally diametrically extending kerf formed therein whose opposite ends are simultaneously registrable with the inner ends of a pair of diametrically aligned generally radial bores formed through the end of the corresponding yoke arm, and a locking pin passed through corresponding ones of said kerfs and radial bores.

4. The combination of claim 3 wherein said pins each have a longitudinally extending and generally radially outwardly opening groove formed therein.

5. The combination of claim 4 wherein the portions of the said pins defining the portions of said grooves confined within said kerfs open outwardly of the latter and are spread apart thereby resisting axial shifting of said portions of said pins through either of the corresponding ones of said radial bores.

6. A universal joint comprising a cross block having a pair of intersecting bores extending therethrough in perpendicular relation to each other, said block having faces orientated in a plane perpendicular to the axis of each of said bores, a pair of yokes, each of the yokes including a pair of arms having parallel inner faces for receiving therebetween the faces on the block, each of said arms having a threaded bore therethrough larger in diameter than the bores through the block and axially aligned therewith when assembled with the block, and a pivot pin extending through each of the arms into the adjacent end portion of a bore in the block, each pivot pin including a threaded outer end portion of a length generally equal to the length of the threaded bore in the arm and an inner journal end portion of lesser diameter than the threaded end portion and journaled in the end of the bore aligned with threaded bore in the arm in which the pivot pin is mounted thereby pivotally attaching the yokes to the block, said bores in the block having a diameter greater than the diameter of the journal end portions of the pins, and cylindrical bearing means disposed between the journal end portions of the pins and the bores through the block, said bearing means being in the form of bushings with one pair of bushings being of a length generally approximating the length of the journal end portions, the other pair of bushings being a part of the ends of the continuous cylindrical bushing extending substantially throughout the length of one of the bores in the block, the inner ends of the short bushings terminating in engagement with the peripheral surface of the elongated cylindrical bushing, all of said bushings having an outer end terminating inwardly of the outer ends of the bores, seal means engaging the outer end of each of said bushings, and a spring washer interposed between the arms and block and engaging the sealing means and retaining the sealing means against the end of the bushing for sealing the same, said washer being in the form of a generally cup-shaped resilient member for taking up wear between the components of the universal joint.

7. The structure as defined in claim 6 wherein said elongated cylindrical bushing is provided with radial apertures therein in the center thereof, said block having a lubricating passage formed therein communicating with the openings in the elongated cylindrical bushing whereby the inner ends of the pivot pins as well as the bushings may be lubricated.

References Cited by the Examiner

UNITED STATES PATENTS

| | | | |
|---|---|---|---|
| 779,903 | 1/05 | Borcorselski | 64—17 |
| 864,014 | 8/07 | Maxwell | 64—17 |
| 1,104,681 | 7/14 | Lee | 151—5 |
| 1,379,371 | 5/21 | Toscas | 151—5 |
| 1,621,216 | 3/27 | Peters | 64—18 |
| 1,826,611 | 10/31 | Furgason | 64—17 |
| 2,018,768 | 10/35 | Swenson. | |
| 2,196,297 | 4/40 | Gagne | 64—17 |
| 2,447,882 | 8/48 | Warner | 64—17 |

ROBERT C. RIORDON, *Primary Examiner.*

FRANK SUSKO, *Examiner.*